April 22, 1969 W. C. BROEKHUYSEN 3,440,450
ELECTRONIC TIMER
Filed July 28, 1965

INVENTOR
WILLIAM C. BROEKHUYSEN
ATTORNEY

United States Patent Office 3,440,450
Patented Apr. 22, 1969

3,440,450
ELECTRONIC TIMER
William C. Broekhuysen, New York, N.Y., assignor to G-V Controls Inc., Livingston, N.J., a corporation of New Jersey
Filed July 28, 1965, Ser. No. 475,436
Int. Cl. H03k *17/26*
U.S. Cl. 307—293 9 Claims

ABSTRACT OF THE DISCLOSURE

The base-emitter path of a sensing transistor is connected between the ratio and timing junctions of a bridge whose terminals are connectible with a unidirectional current source, and the transistor collector is connected with one bridge terminal. Variable-impedance means, connected between the transistor emitter and the other bridge terminal and including a normally open electronic switch, are effective when that switch is closed to reduce the impedance to total emitter current lying between the emitter and that other terminal, and that switch is closed in response to the flow of collector current in the transistor.

Figure 1:
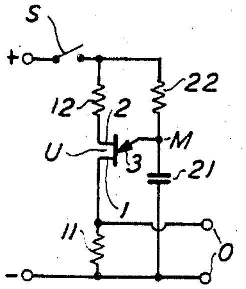

This invention relates to an electronic timer—e.g. to an electronic system which will energize its output at the expiration of a predetermined interval of time after the supply of power to the system.

For such timers there has been extensively used the unijunction transistor, whose abrupt change of conduction, from relatively minute to relatively high, invoked by an initially minute sensing current which that transistor inherently magnifies, is a very well suited characteristic. Unfortunately, however, the use of such transistors in commercial electronic-timer production has proven unsatisfactory, due to substantial variations of important parameters from transistor to transistor of the same type or even of the same batch, as well as to wide variations of some of those parameters with temperature. Thus the base-to-base resistance of such transistors may typically vary over a 3:2 range and moreover has a high positive temperature coefficient; the stand-off ratio may typically vary over a 4:3 range; the peak-point current may typically vary over a 50:1 range at room temperature and moreover increases at low temperatures; and the valley-point current also varies from transistor to transistor and with temperature. These substantial variations not only impose severe limitations, such as on the maximum time delays that can be achieved and on the maximum temperature deviations from normal within which the timer will operate satisfactorily, but also entail the need to effect many different compensations, with the result that in practice each individual timer must be laboriously "tailored."

An object of the invention is to provide an electronic timer characterized by the major advantages afforded by the use of a unijunction transistor but free of the major if not all disadvantages and limitations which the use of the unijunction transistor entails.

According to the invention there is used, across a pair of terminals connectible with the current source, a bridge having two parallel circuits one comprising two ratio arms serially connected together at a ratio junction and the other comprising two timing arms serially connected together at a timing junction. A sensing transistor of the type having an emitter, a base and a collector is employed, its base-emitter path being serially connected between those junctions; suitable means connect the collector of that transistor with that one of the terminals whose potential will bias that collector for the flow of collector current in response to current flow in the base-emitter path of the transistor. A circuit is connected between the emitter of the sensing transistor and the other of the terminals for imposing on that emitter a current load additional to that imposed by the bridge; that circuit includes a normally open electronic switch, and means are operatively connected with the collector of the sensing transistor, and are responsive to the flow of collector current in that transistor, for closing that switch.

Preferably the sensing transistor is a silicon transistor of n-p-n conductivity. A protective diode may be inserted in series with the base-emitter path between the junctions, preferably at the base end of that path. Preferably the base end of that path is disposed toward the timing junction.

The electronic switch may comprise a switching transistor having its collector-emitter path connected in the last-mentioned circuit, and the switch-closing means may be means operatively connecting the base-emitter path of the switching transistor with the collector of the sensing transistor. The timing arms mentioned above may be respectively a capacitor and a resistor through which that capacitor may be charged, and the base-emitter path of the sensing transistor and the collector-emitter path of the switching transistor may be in series with each other and in discharging relationship to the capacitor. The switching transistor may be connected to act also as an amplifier of the collector current of the sensing transistor. The means operatively connecting the base-emitter path of the switching transistor with the collector of the sensing transistor may include an amplifying transistor operatively interposed between that collector and that base-emitter path.

The system may further include an electrically triggerable output device, and means responsive to the flow of current amplified by the switching transistor, or by it and the amplifying transistor, for triggering the output device.

A general object of the invention was initially stated above. Another general object is the provision of an improved and commercially producible electronic timer. Allied and other and more specific objects will be apparent from the following detailed description and the appended claims.

Figure 2:
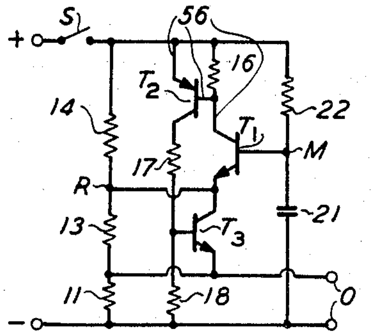
Figure 2A:
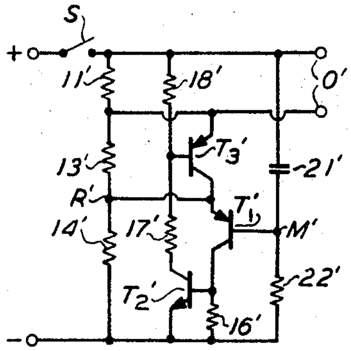
Figure 3:
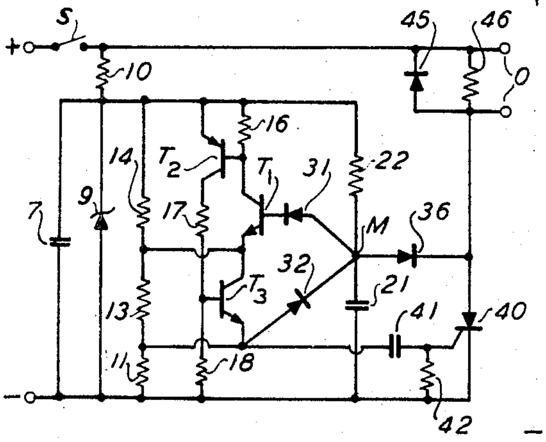
Figure 4:
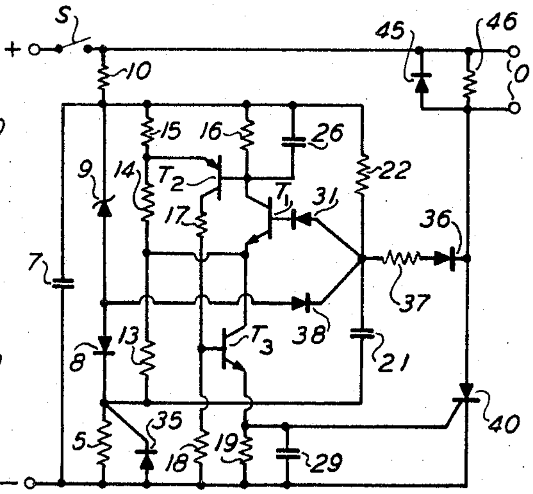
Figure 1A:
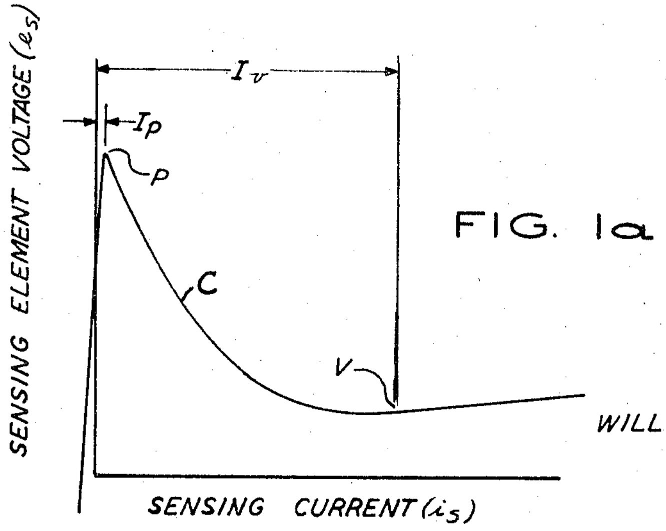

In the detailed description hereinafter set forth reference is made to the accompanying drawings, in which:

FIGURE 1 is a schematic diagram of a simple electronic timer employing a unijunction transistor;

FIGURE 1*a* is a characteristic curve, of voltage plotted against current, to which reference is made in connection with FIGURE 1;

FIGURE 2 is a schematic diagram of a simple electronic timer according to my invention;

FIGURE 2*a* is a schematic diagram of a modification of the timer of FIGURE 2 in respect of arrangement and of transistor conductivities;

FIGURE 3 is a schematic diagram of an elaborated electronic timer according to the invention; and FIGURE 4 is a schematic diagram of a modification of FIGURE 3.

Reference being had to FIGURE 1, there will be seen a simple electronic timer of known design utilizing a unijunction transistor with lower base 1, upper base 2 and emitter 3; the transistor is characterized by a stand-off ratio $\eta$. Base 1 is connected to negative line potential through a resistor 11 (of value $r_{11}$); base 2 is connected to positive line potential, this connection being made through a resistor 12 whose value ($r_{12}$) is very small compared to the base-to-base resistance ($r_{bb}$) of the transistor but whose presence is important for temperature-compensation purposes. In parallel with the circuit formed by resistor 11, the base-to-base path 1–2 and the resistor 12 there is connected a timing circuit serially comprising a capacitor 21 and a resistor 22, the capacitor being disposed in the more negative position. The "timing junction" M formed between 21 and 22 is connected to the emitter 3 of the transistor U. A switch S may be inserted in one of the line conductors, typically the positive one, to effect the connection and disconnection of the timer to and from the line.

As is well understood, the transistor U in the absence of current flow into its emitter 3 may be viewed as a resistance $r_{bb}$ to an intermediate point on which there is connected a diode whose anode is the emitter 3. Accordingly when the timer of FIGURE 1 is first connected to the line (whose voltage may be designated as E) the circuit 11–1–2–12 will be traversed by a current of value $$\frac{E}{r_{11}+r_{bb}+r_{12}}$$

at the same time the capacitor 21 will begin to charge through the resistor 22. When the potential at the timing junction M has risen to slightly over $$E\cdot\frac{r_{11}+\eta r_{bb}}{r_{11}+r_{bb}+r_{12}}$$

current will begin to flow from M through the emitter 3 into the transistor U; since it is the onset of this current which senses the arrival of the junction M at the stated potential, this current may be termed a sensing current and the emitter 3 a sensing element. In effect the timer of FIGURE 1 is a bridge consisting of two circuits in parallel across the line, one of which is the timing circuit consisting of the serially connected timing arms 21 and 22; the other is a ratio circuit comprising two serially connected ratio arms—one in the form of resistor 11 together with a fraction ($\eta$) of the base-to-base resistance of U, and the other in the form of the remainder of that base-to-base resistance together with resistor 12.

After the sensing current has risen to a minute but finite value, its further rise is accompanied by a marked and abrupt decrease of the voltage between the emitter 3 and the base 1, one effect of which is to increase the current flow into the base 2. A further and important effect is greatly to increase the sensing current itself; this will be seen from FIGURE 1*a*, wherein C is a curve of emitter-to-base-1 voltage plotted against emitter current (i.e. of voltage on the sensing element plotted against sensing current). In this curve the point P, at which the current has the value $I_p$, is a peak point of maximum emitter-to-base-1 voltage; the point V, at which the current has the value $I_v$, is a valley point of minimum such voltage, beyond which that voltage again rises—but only slowly, the transistor then being in a "saturated" condition. Thus within a minute interval beginning when sensing current starts to flow the transistor U changes from a state of relatively low to a state of relatively high conduction; this change is reflected, for example, in an abrupt rise of voltage across resistor 11, for which reason the output terminals O are shown in FIGURE 1 connected across that resistor.

It will be appreciated that the curve C, in its portion between points P and V, shows a decrease of voltage with an increase of current—a characteristic frequently referred to as negative resistance.

In view of that negative-resistance characteristic the unijunction-transistor timer inherently provides the highly favorable action of automatically lowering the effective resistance of its lower ratio arm in response to a minute sensing current—that lowering in turn resulting in an increase of that current. It also inherently provides compensation for supply-voltage variations—that is to say that its timing action is substantially independent of the supply voltage, provided that voltage does not change during the timing interval. On the other hand there were introductorily mentioned some of the unijunction transistor's variations of parameters from transistor to transistor and with temperature, and these pose serious problems. Thus the unit-to-unit variation and high temperature coefficient of $r_{bb}$ entail the necessity critically to select the value of resistor 12 for each individual timer; the unit-to-unit variation of $\eta$ entails the necessity to vary the timing-circuit parameters from timer to timer; the unit-to-unit variation of $I_p$ severely limits the maximum time delay achievable with any but critically selected unijunction transistors, and its temperature sensitivity seriously limits the tolerable downward temperature deviations from normal; the unit-to-unit variation of $I_v$ causes substantial variations in the residual voltage to which capacitor 21 will discharge through the emitter-to-base-1 path of the transistor while the timer remains connected to the line.

There are known electronic timers which employ, instead of a unijunction transistor, a pair of simple transistors of mutually opposite conductivities, or an SCR or SCS. Insofar as I am aware, however, those timers forego, to their disadvantage, the especially favorable action of the unijunction-transistor timer mentioned at the beginning of the preceding paragraph, beside having other disadvantages. According to my invention I achieve that favorable action, while avoiding the disadvantages of the actual use of the unijunction transistor as well as the disadvantages of such other timers as are referred to at the beginning of this paragraph.

FIGURE 2 illustrates a simple timing circuit in accordance with the invention. Herein there is again provided across the line the timing circuit comprising the timing arms 21 and 22 serially connected together at the timing junction M. In parallel with the timing circuit there is provided a ratio circuit one of whose arms comprises the resistors 11 and 13 in series with each other, and the other of whose arms comprises the resistor 14 serially connected to the first ratio arm at the ratio junction R; since the resistances in the ratio circuit are discrete resistors and the ratio junction R is accessible, there is of course full opportunity to control or adjust the ratio $$\frac{r_{11}+r_{13}}{r_{11}+r_{13}+r_{14}}$$

(which is the equivalent of the unijunction transistor's fixed stand-off ratio). Between the junctions M and R there is connected the base-emitter path of a sensing transistor $T_1$, which in FIGURE 2 is an n-p-n transistor; more specifically, the base of $T_1$ is connected to M and the emitter to R.

The collector of the sensing transistor $T_1$ is connected to that one of the line potentials which will bias it for collector current flow in response to current flow in its base-emitter path; $T_1$ being an n-p-n transistor, that line potential is the positive one, and the connection of the collector to it may be made through the conductor 56.

Between the emitter of the sensing transistor $T_1$ and the other, or negative, line potential there are connected variable-impedance circuit means, including a normally open electronic switch, effective when that switch is closed to reduce the impedance to total emitter current lying between the emitter and that other potential or terminal. In FIGURE 2 that electronic switch is a switching transistor $T_3$ (which may be of conductivity similar to that of $T_1$ and thus, more specifically, an n-p-n), and those variable-impedance means are the collector-emitter path of $T_3$ taken with resistor 11 (which resistor is therefore common both to that circuit and to one of the ratio arms of the bridge, but is typically small in value relative to resistor 13 which forms the principal portion of that arm).

There are provided means operatively connected with the collector of, and responsive to the flow of collector current in, the sensing transistor $T_1$ for closing the switch formed by the switching transistor $T_3$. More specifically, those means may comprise means operatively connecting the base-emitter path of the switching transistor $T_3$ with the collector of the sensing transistor $T_1$. Still more specifically, those means may comprise an amplifying transistor $T_2$, of conductivity opposite to that of $T_1$ and $T_3$ (and thus, specifically, a p-n-p), whose base-emitter path may be serially interposed in the conductor 56 (which leads from the $T_1$ collector) and whose collector may be connected to the base-emitter path of $T_3$ through the current-limiting resistor 17.

To avoid "floating" of the $T_2$ and $T_3$ bases a resistor 16 may be shunted across the base-emitter path of $T_2$ and a resistor 18 may be connected from the $T_3$ base—for example to the lower-potential extremity of resistor 11, so that the voltage drop across 11 will provide a small reverse bias for the $T_3$ base. It will be appreciated that so long as no current flows in the base-emitter path of the sensing transistor $T_1$ the base-emitter path of each of the transistors $T_2$ and $T_3$ will be without forward bias, and the electronic switch formed by the switching transistor $T_3$ will be open.

In operation, when switch S is closed capacitor 21 will begin to charge through resistor 22. When the potential of the timing junction M has risen to slightly over that of the ratio junction R, sensing current will begin to flow through the base-emitter path of $T_1$. The accompanying larger collector current in $T_1$ flows through the base-emitter path of $T_2$; in turn the accompanying still larger collector current in $T_2$—subject to the minute delay occurring until it builds up a voltage across resistor 18 slightly in excess of the drop in resistor 11—flows through the base-emitter path of $T_3$. This causes the collector-emitter resistance of $T_3$ to reduce from essentially infinity toward a very low value, thereby reducing the impedance of the variable-impedance means referred to in the third preceding paragraph, thus reducing the impedance to total emitter current lying between the emitter and the negative terminal, progressively loading the emitter of the sensing transistor $T_1$ and in turn increasing the flow of the initial sensing current—i.e., the current in that transistor's base-emitter path—so that the action of the circuit is a regenerative one and thus characterized by negative resistance. The resulting abruptly increasing current through resistor 11 is qualitatively analogous to that occurring in the circuit of FIGURE 1, and again output terminals O are shown connected across that resistor.

In the timer of FIGURE 1 the abrupt assumption by the unijection transistor U of a state of high conduction—i.e. the "firing" of the FIGURE-1 timer—results in the discharge of capacitor 21 through the diode formed at the emitter 3, the abruptly reduced lower portion of the base-to-base resistance of U, the resistor 11. Analogously in the circuit of FIGURE 2 the abrupt loading of the emitter of the sensing transistor $T_1$ by the circuit including the now-saturated switching transistors $T_3$—i.e. the firing of the FIGURE-2 timer—results in the discharge of capacitor 21 through the base-emitter path of $T_1$, the collector-emitter path of $T_3$ and the resistor 11. The firing action is still explained by a curve qualitatively similar to C of FIGURE 1*a*, expressing the relationship between the voltage on the sensing element (now the base of $T_1$) relative to the upper extremity of resistor 11.

But the analogies stop here. If the total gain of $T_1$, $T_2$ and $T_3$ be high—a criterion easily met without requirements peculiar to any one—the peak-point current $I_p$ in the case of FIGURE 2 is much lower than that in the case of FIGURE 1 with any available unijunction transistor, dependably enabling long time delays; furthermore the "hold-in" current, or minimum base current of $T_1$ which will keep $T_3$ saturated, tends to be much lower than in the case of the unijunction transistor, wherein it is of course the emitter-3 current. In practice it has been found desirable to select $T_1$ to have a relatively high gain at a low base-current level (such as 1 microampere)—but that if this be done the gains of the transistors $T_2$ and $T_3$ are in no sense critical and may permissibly be relatively low.

An important ancillary advantage of the timer of FIGURE 2 is that, if $T_1$ be a silicon transistor as I strongly prefer, it takes advantage for its sensing transistor of the great improvements which have been made in the production of silicon n-p-n transistors, which have been the subject of much more intensive efforts than have been made with respect to unijunction transistors. It remains nevertheless true that novel aspects of the FIGURE-2 timer can be availed of in a timer in which the respective conductivities of the several transistors are in each instance reversed. To illustrate this FIGURE 2*a* shows the timer of FIGURE 2 on a "mirror image" basis, in which each of the transistors $T_1$ and $T_3$ is a p-n-p and transistor $T_2$ is an n-p-n. In FIGURE 2*a* each element, in view of its inverted position (and, in the case of the transistors, opposite conductivity) is designated by a reference numeral corresponding to that used for that element in FIGURE 2 but furnished with a prime mark.

FIGURE 2 illustrates a timer in which various fundamental actions according to my invention take place. It will be understood, however, that in practice there may be desirable certain elaborations of that timer, to attend to such matters as a regulation of the line voltage (lest it change during the timing interval), an insurance that the capacitor 21 will reliably be in a uniform state of charge at the beginning of each timing interval, an adaptation of the timer to the energization of a low-impedance load, and the like. To attend to those and similar matters it may be desirable to elaborate the timer of FIGURE 2, and FIGURE 3 shows one form to which it may be thus elaborated.

A first matter which is attended to in the circuit of FIGURE 3 is the protection of the sensing transistor $T_1$ against the conduction of reverse current when the timer is used with a substantial line voltage. Typically reverse current may flow when the base-emitter voltage constitutes a reverse bias of those electrodes of several volts or more. The ratio junction R is typically at about mid-line potential, and at the start of a timing interval (when the capacitor 21 is discharged) the timing junction M is at negative line potential; accordingly if the line voltage be of the order of 10 volts or more, an excessive reverse bias may temporarily be applied to the base-emitter path of $T_1$. To avoid this there may be connected in series with that path the protective diode 31. I prefer that it be, and it is shown as being, at the base end of that path—i.e. connected between the base of $T_1$ and the timing junction M.

To regulate the line voltage—i.e. the voltage applied across the terminals between which the ratio and timing circuits 11–13–14 and 21–22 are disposed—there may be interposed in the connection of one of those terminals (typically the positive one) to the supply or current course a ballast resistor 10, and across those terminals there may be connected in appropriate polarity a Zener diode 9; the switch S may be repositioned between the resistor 10 and the current course. To help in insuring a minimum effect of negative-going transients in the current source, and to overcome any tendencies to the unintended flow of current in the transistors as an incident of closure of the switch S due to their interelectrode capacities, a filter capacitor 7 may be connected in parallel with the Zener diode 9.

Although the capacitor 21 of FIGURE 2 may upon firing of the timer quickly discharge through the base-emitter path of $T_1$, the collector-emitter path of the saturated $T_3$ and the resistor 11, and may open opening of switch S discharge or continue to discharge through that base-emitter path and the resistors 13 and 11, there are circumstances of use under which there may be a tendency for a small but variable residual charge to remain in that capacitor. To overcome that the capacitor 21 may be subjected, as in incident to closing of switch S, to a modest quick fixed initial charge; for this purpose the diode 32 is shown connected from the top extremity of resistor 11 to the timing junction M.

In FIGURE 3 the timer is shown connected to an electrically triggerable output device which it is arranged to trigger when it fires. This device may typically be a silicon controlled rectifier (or SCR) 40, whose cathode may be connected to negative line potential and whose anode may be connected to the switch S via output terminals O, to which any suitable load (not shown) may be connected; shunted across those terminals there are shown the reversely poled diode 45 to protect the load against transients incident to the deenergization of the SCR, and a resistor 46 completing the anode circuit during any temporary absence of the actual load. "Floating" of the cathode gate of the SCR may be avoided by connecting it to negative line potential through a relatively high-valued resistor 42. Arrangement of the SCR to be triggered on firing of the timer may be accomplished by connecting its cathode gate to the top extremity of resistor 11 through a capacitor 41.

The presence of the SCR may be availed of to provide an additional or preferred path for discharge of the capacitor 21 on firing of the timer. This is simply accomplished by connecting a diode 36 from the timing junction M to the anode of the SCR40. The path 36–40 insures the essentially instantaneous and almost complete discharge of capacitor 21.

FIGURE 4 illustrates a modification of the timer of FIGURE 3 in several respects. First, resistor 11 is replaced by a resistor 5 shunted by a reversely poled diode 35, and the negative terminal of the Zener diode 9 is removed from negative line potential and instead connected through a diode 8 to the upper extremity of that resistor 5. The initial-charge diode 32 of FIGURE 3 is eliminated, and in place of its action there is relied on the action, upon firing, of a positive discharge of the capacitor 21 to zero charge. This is accomplished by connecting a diode 38 from the upper extremity of diode 8 to the timing junction M, and inserting a modest-valued ballast resistor 37 in series with the diode 36 which leads from that junction to the anode of the SCR.

At all times while switch S is closed a substantial current flows through the diode 8, developing thereacross normal diode drop. Upon firing, the circuit 37–36–40 insures the passage of sufficient current through the diode 38 to develop normal diode drop across that diode as well. (This obviously could not have been accomplished in the absence of resistor 5.) Upon firing of the timer the capacitor 21 discharges through the circuit 37–36–40 and diode 35; at the same time its two plates are connected to the respective negative extremities of two diodes whose positive extremities are common and across each of which there is occurring normal diode drop, and there is thereby enforced a discharge of the capacitor to zero charge.

In FIGURE 4 there is shown a specifically different coupling of the cathode gate of SCR40 to the timer than is shown in FIGURE 3. The capacitor 41 and high-valued resistor 42 are eliminated, and the cathode gate is directly connected to the emitter of transistor $T_3$—between which and negative line potential there is connected the resistor 19 shunted by a small capacitor 29. No current flows in resistor 19 until firing—but then the emitter current of the then-saturated $T_3$ flows through that resistor, reliably triggering the SCR. Capacitor 29 reduces the possibility of triggering of the SCR by stray impulses. FIGURE 4 retains the advantage of FIGURE 3 that it is by the amplified current output of transistor $T_3$ that the SCR is triggered.

In the circuit of FIGURE 3 (or FIGURE 2) a small negative bias for the base-emitter path of transistor $T_3$ was provided by the voltage across resistor 11, which was of some benefit in reducing the sensitivity of the timer to negative-going transients which survived the action of the filter capacitor 7. By the change mentioned in the preceding paragraph this action has been eliminated in FIGURE 4. A better such action is, however, provided by inserting a modest-valued resistor 15 between resistors 14 and 10, and connecting the emitter of transistor $T_2$ to the junction between resistors 14 and 15 thereby to provide a small reverse bias for the emitter-base path of transistor $T_2$, and by shunting resistor 16 by a capacitor 26. This has the further advantage of permitting a small leakage current to flow between the collector and emitter of transistor $T_1$ without causing transistor $T_2$ to become conductive; resistor 16 may be shunted by a serially arranged thermistor and resistor to take care of the sharp increase in this leakage current at very high temperatures without having to make the voltage across resistor 15 very large.

While I have shown and described my invention in terms of particular embodiments thereof, I intend thereby no unnecessary limitations. Modifications in many respects will be suggested by my disclosure to those skilled in the art, and such modifications will not necessarily constitute departures from the spirit of the invention or from its scope, which I undertake to set forth in the following claims.

I claim:

1. In combination in an electronic timer: a pair of terminals connectible with a source of unidirectional current; a bridge having two circuits each extending between said terminals, one circuit comprising two ratio arms serially connected together at a ratio junction and the other circuit comprising two timing arms serially connected together at a timing junction; a sensing transistor having an emitter, a base and a collector and having its base-emitter path connected between said junctions; means connecting the collector of said sensing transistor with that one of said terminals whose potential will bias said collector for the flow of collector current in response to current flow in said base-emitter path; variable-impedance means, connected between the emitter of said sensing transistor and the other of said terminals and including a normally open electronic switch, effective when said switch is closed to reduce the impedance to total emitter current lying between said emitter and said other terminal; and means operatively connected with the collector of, and responsive to the flow of collector current in, said sensing transistor for closing said switch and thereby reducing said impedance.

2. The subject matter claimed in claim 1 wherein said sensing transistor is a silicon transistor of n-p-n conductivity.

3. The subject matter claimed in claim 1 further including a protective diode connected in series with said base-emitter path between said junctions.

4. The subject matter claimed in claim 3 wherein said protective diode is connected at the base end of said path.

5. The subject matter claimed in claim 1 wherein the base end of said path is disposed toward said timing junction.

6. The subject matter claimed in claim 1 wherein said electronic switch comprises a switching transistor having its collector-emitter path connected in said last-recited circuit and wherein said switch-closing means comprises means operatively connecting the base-emitter path of said switching transistor with the collector of said sensing transistor.

7. The subject matter claimed in claim 6 wherein said switching transistor is connected to act also as an amplifier of the collector current of said sensing transistor, further including an electrically triggerable output device and means responsive to the flow of current amplified by said switching transistor for triggering said output device.

8. The subject matter claimed in claim 6 wherein said last-recited means includes an amplifying transistor operatively interposed between the collector of said sensing transistor and the base-emitter path of said switching transistor.

9. The subject matter claimed in claim 6 wherein said timing arms are respecively a capacitor and a resistor through which the capacitor may be charged, and wherein the base-emitter path of said sensing transistor and the collector-emitter path of said switching transistor are in series with each other and in discharging relationship to said capacitor.

References Cited

UNITED STATES PATENTS

| | | | |
|---|---|---|---|
| 3,243,601 | 3/1966 | Higginbotham | 307—88.5 |
| 3,282,631 | 11/1966 | Mosinski | 307—88.5 |
| 3,317,745 | 5/1967 | Scharf | 307—88.5 |

ARTHUR GAUSS, *Primary Examiner.*

HAROLD A. DIXON, *Assistant Examiner.*

U.S. Cl. X.R.

307—313